US011555481B2

(12) United States Patent
Rosen (10) Patent No.: US 11,555,481 B2
(45) Date of Patent: Jan. 17, 2023

(54) INSPECTION DEVICE CONTROLLER FOR AN INSPECTION DEVICE OF A WIND POWER PLANT

(71) Applicant: Johannes Rosen, Mülheim (DE)

(72) Inventor: Johannes Rosen, Mülheim (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 16/558,804

(22) Filed: Sep. 3, 2019

(65) Prior Publication Data

US 2020/0018291 A1 Jan. 16, 2020

Related U.S. Application Data

(63) Continuation of application No. PCT/EP2018/050237, filed on Jan. 5, 2018.

(30) Foreign Application Priority Data

Mar. 3, 2017 (DE) ..................... 10 2017 104 490.6

(51) Int. Cl.
*F03D 17/00* (2016.01)
*B64C 39/02* (2006.01)
(52) U.S. Cl.
CPC ............ *F03D 17/00* (2016.05); *B64C 39/024* (2013.01); *B64C 2201/027* (2013.01); *B64C 2201/12* (2013.01)
(58) Field of Classification Search
CPC . F03D 17/00; B64C 39/024; B64C 2201/027; B64C 2201/12
See application file for complete search history.

(56) References Cited

U.S. PATENT DOCUMENTS 8,439,301 B1 * 5/2013 Lussier ................. B64C 39/024
244/63
2010/0280872 A1 * 11/2010 Scholte-Wassink ........................
G06Q 10/06311
705/7.13

(Continued)

FOREIGN PATENT DOCUMENTS

CN 204895845 U 12/2015
CN 204979263 U 1/2016

(Continued)

OTHER PUBLICATIONS

Schäfer BE, Picchi D, Engelhardt T, Abel D. Multicopter unmanned aerial vehicle for automated inspection of wind turbines. In2016 24th Mediterranean Conference on Control and Automation (MED) Jun. 21, 2016 (pp. 244-249). IEEE. (Year: 2016).*

(Continued)

*Primary Examiner* — Chuen-Meei Gan
(74) *Attorney, Agent, or Firm* — Reinhart Boerner Van Deuren P.C.

(57) ABSTRACT

An inspection device control device for an inspection device of a wind turbine having a device interface arranged for communication with a wind turbine control of the wind turbine, and a device interface arranged for communication with the inspection device. Automated resource planning is possible if a processor produces control information for the inspection device depending on turbine parameters of the wind turbine received via the device interface and outputs the control information via the device interface. Further improved resource planning and control is made possible if a processor generates control information for the wind turbine and outputs the control information via the turbine interface, depending on the device parameters of the inspection device received via the device interface.

12 Claims, 5 Drawing Sheets

(56) References Cited

U.S. PATENT DOCUMENTS

| | | | | |
|---|---|---|---|---|
| 2012/0136630 A1* | 5/2012 | Murphy | ............... | F03D 80/50 |
| | | | | 702/188 |
| 2012/0300059 A1* | 11/2012 | Stege | ................. | F03D 17/00 |
| | | | | 348/114 |
| 2016/0017866 A1* | 1/2016 | Craft | ................. | H04N 7/185 |
| | | | | 348/46 |
| 2016/0047850 A1* | 2/2016 | Bruins | ................ | F03D 80/00 |
| | | | | 324/715 |
| 2016/0292872 A1* | 10/2016 | Hammond | ........ | G01S 17/933 |
| 2018/0149138 A1* | 5/2018 | Thiercelin | .......... | B64D 47/08 |

FOREIGN PATENT DOCUMENTS

| | | | |
|---|---|---|---|
| CN | 105346727 A | 2/2016 | |
| CN | 105 717 934 A | 6/2016 | |
| DE | 10 2013 113326 A1 | 6/2015 | |
| DE | 20 2015 102 754 U1 | 7/2015 | |
| EP | 2 940 298 A1 | 11/2015 | |
| EP | 3 109 716 A1 | 12/2016 | |
| WO | WO 2017/010206 A1 | 1/2017 | |
| WO | WO-2017050893 A1 * | 3/2017 | ......... G01N 21/9515 |

OTHER PUBLICATIONS

Stokkeland M, Klausen K, Johansen TA. Autonomous visual navigation of unmanned aerial vehicle for wind turbine inspection. In2015 International Conference on Unmanned Aircraft Systems (ICUAS) Jun. 9, 2015 (pp. 998-1007). IEEE. (Year: 2015).*

* cited by examiner

INSPECTION DEVICE CONTROLLER FOR AN INSPECTION DEVICE OF A WIND POWER PLANT

CROSS-REFERENCE TO RELATED PATENT APPLICATIONS

This patent application is a continuation of PCT/EP2018/050237, filed Jan. 5, 2018, which claims priority to German Patent Application No. 10 2017 104 490.6, filed Mar. 3, 2017, the entire teachings and disclosure of which are incorporated herein by reference thereto.

FIELD

The subject matter relates to an inspection device control device for an inspection device of a wind turbine, an inspection device of a wind turbine and a method of operating an inspection device control device.

BACKGROUND

During the operation of wind turbines, in particular in offshore areas, damage can occur, in particular to the rotor blades of the wind turbines. In order to be able to detect these damages at an early stage, a control by means of flying drones is used in addition to a manual control. In the case of manual inspection, the wind turbine is switched off, technicians climb onto the wind turbine or the rotor blades are recorded with the aid of telescopes and video cameras. This is particularly problematic with offshore installations, as a calm sea is necessary for the transfer of personnel and the positioning possibilities and thus the visual axes of telescopes or video cameras are limited.

Flying inspection platforms, such as flying drones, offer advantages over manual inspection, particularly because of their greater degrees of freedom and speeds of movement in space. However, the flying inspection platforms usually have to be controlled manually. Inspections are usually carried out in calm weather, i.e. at rather low wind speeds. In stronger winds, the recording quality is usually impaired and the flight time reduced or the inspection aborted.

The approach of the wind turbine is usually done manually, whereby the images are often not usable due to the environmental conditions. Especially if there are too strong or too weak contrasts between the sky and the surface of the rotor blade or the position of the sun is bad (e.g. back light) or clouds or fog are present, the images cannot be taken with sufficient quality. Therefore the recording quality is strongly dependent on the individual knowledge and skills of the operator who controls the inspection platform.

Usually, the wind turbine is switched off for the duration of the inspection. An inspection while the wind turbine is running presents the operator of the flying inspection platform with great challenges. The latter must always keep the inspection platform at the correct distance from the wind turbine and, in doing so, time the triggering time of a camera, for example, as optimally as possible. Also, one operator can only operate one flying inspection platform at a time, so that the personnel expenditure for the inspection of the wind turbines is considerable.

WO 2017/010206 A1 discloses a procedure for fastening a blade of a wind turbine rotor that is to be aligned horizontally.

EP 3 109 716 A1 describes a method for diagnosing the components of the wind farm, which is characterized by the fact that the inspection of the wind farm is carried out autonomously.

For this reason, the subject matter was based on the object of optimizing the inspection of wind turbines with regard to their recording quality as well as the possible operating times.

BRIEF SUMMARY

This object is solved by an inspection device control device, an inspection device, and a method as disclosed herein.

It is proposed that both communication with an equipment controller and communication with an inspection device, in particular from a central location, can be carried out. This central location, i.e. the inspection device control device, can also be understood as a control station or a control room. The inspection device control device needs not necessarily be completely centralised. It can also be distributed decentrally on fixed and/or mobile units, e.g. wind turbines, ships, transformer stations, the inspection device itself, etc.

The wind turbine parameters can be received via the turbine interface. Such turbine parameters may include azimuth angle, hub angle, pitch angle, rotor blade geometry, wind turbine geometry, wind turbine CAD data, hub rotation speed and/or wind turbine positioning in a wind farm or the like. With the help of these turbine parameters, the inspection device can be controlled by creating control information (control data) for the inspection device and output via the device interface, depending on the turbine parameters. The inspection device control device may also control the operation of the wind turbine and/or coordinate the operation of the inspection device and the wind turbine.

Control information for the inspection device can be, in particular, flight paths, target coordinates, flight times, alignment information, operating information for sensors, distance information or the like. Control information for the wind turbine can in particular be its azimuth angle, hub angle or pitch angle.

In the following, further turbine parameters as well as control information and/or operating parameters are described, which can also all be used for the present equipment.

With the help of this method, it is possible to classify certain damages to a wind turbine, in particular to a rotor blade, in the best possible way. In the course of an ongoing inspection, areas that have been detected and possibly damaged can be inspected almost in real time. In particular, the positioning of the inspection device relative to the wind turbine can be set automatically by means of the control information, thus creating specific lighting situations that enable the best possible classification of possible damage.

In particular, the control information is such that the inspection device is preferably operated on the windward side of the wind turbine or the respective rotor blade. For this purpose, the positioning and control of the inspection device relative to the wind turbine on a flight path is calculated, the flight path being included in the control information. By knowing the turbine location and the wind direction as well as a corresponding calculation of the flight path, it can be ensured that the inspection device is on the windward side of the wind turbine. This ensures that the inspection device is only exposed to comparatively low turbulence. A rotor blade can be inspected along both blade edges, i.e. the front blade edge and the rear blade edge, by suitable control of the inspection device.

The automatic or semi-automatic control on the basis of the control information allows the flight time and/or the flight path (flight route) to be optimised and/or the deployment of personnel to be minimised.

With the help of the control information, it is possible to inspect at least one, preferably all, rotor blades of at least one turbine with the inspection device during an inspection cycle. For this purpose, the control information is used to calculate a flight route and/or flight time necessary to inspect one or more rotor blades of one or more turbines.

Through an automatic variation of turbine parameters (via the control information for the wind turbine), it is possible to optimally align the wind turbine for an inspection cycle. An optimally aligned wind turbine makes it possible to minimize the flight time for the inspection of one or more rotor blades and thus increase the number of inspections per inspection cycle, especially per flight. In particular, turbine parameters of the wind turbine can be set in such a way that the wind turbine has such a relative orientation to the solar- and/or wind direction that a sensor (in particular a camera) arranged on the inspection device finds optimised recording conditions. The wind turbine can stand still, run in tumble mode or in normal operation. In particular, the rotor blades of the wind turbine can be brought into a flag position.

The control information makes it possible not only to adapt the flight route to the currently valid boundary conditions, in particular the currently valid turbine parameters, but also to plan tank/loading stops and the like. A flight route can be calculated in such a way that the flight time is optimally used and the inspection device is moved to a tank/charging station at the end of the flight time in order to be charged there for the next inspection run.

According to the subject matter, it is proposed that a turbine interface is suitable for communication with a wind turbine control system of the wind turbine. Via the turbine interface, turbine parameters of the wind turbine can be fed into the inspection device control device according to the subject matter. It is also possible to output turbine parameters (as control information) for the wind turbine via the turbine interface. Turbine parameters may include wind turbine parameters such as azimuth angle, pitch angle, rotor rotation angle and/or rotor hub angular velocity.

The turbine parameters can be read in manually or via a data interface. Especially a connection to a SCADA system is possible. The turbine interface as well as the device interface can be a wired or wireless interface, in particular a radio data interface (telemetry), a WLAN interface or a Bluetooth interface.

In the event of a data link failure or the absence of turbine parameters, it is possible for the inspection device to determine the azimuth angle, pitch angle and/or rotor rotation angle. This can be done, for example, by optical or other markings, in particular reflectors. It is also possible for a rotor blade to be optically or otherwise coded and for the inspection device to be automatically aligned with a rotor blade, e.g. by means of imaging procedures such as stereoscopy or other positioning aids (sonar, radar, laser, laser scanner, optical flux, etc.). Markings can be placed on a rotor blade, hub, nacelle and/or tower. These markings or reflectors can be evaluated using an imaging procedure. The resulting turbine parameters can be fed into the turbine interface.

With the help of the control information, it is possible to set the flight route or the inspection route of the inspection device. It has been found that an inspection path parallel to a straight line intersecting the rotor rotation plane, especially at the hub center, is advantageous. The inspection device receives information with the control information on how it can move parallel to the rotor rotation plane.

In particular, the control information may include information that the inspection device is moving along a rotor radius or rotor diameter parallel to the rotor rotation plane. In particular, the movement can run along the entire diameter, i.e. from blade tip to blade tip. This means that the flight distance per turbine can be limited to one rotor length when the rotor is rotating and the light falls on it. To take a picture of the front and back of the rotor blade, however, the camera would have to be aligned alternately diagonally upwards and then diagonally downwards at each shooting position along the radius. Alternatively, the inspection device can have two recording sensors whose optical axes are at an angle to each other. The suction side or the pressure side of a rotor blade is recorded and, in addition, the pressure side or the suction side of an adjacent blade.

When the rotor is rotating, the inspection device can thus hold one or more full rotations of the rotor in one position and inspect each individual edge of the rotor blade. By shifting the position, a new area of the blade edges can be inspected. In a first half diameter, i.e. for example in a first segment of a circle, the inspection device can inspect one or both blade edges as well as the blade surface of one or more rotor blades on the pressure side. If the inspection device now moves to the other side, i.e. the other half diameter or the other circular segment, the inspection device can then inspect the other rotor blade surface (suction side) and the blade edges from the other side. In particular, the flight path is offset from the line of the rotor diameter. Depending on the local alignment of the rotor blade surface which is most favourable for the acquisition, the images can be taken at different positions along the rotor radius at different hub angles, whereby the acquisition unit and the acquisition parameters (e.g. zoom) can be adjusted accordingly.

The movement of the inspection device can run along a plane parallel to the rotor rotation plane. In a first half diameter, a first blade side is inspected from this plane and on the other half plane, an inspection of the opposite blade side is possible from the same plane. With the help of this flight path, it is possible to inspect both sides of the blade from an observation plane on the windward side with as short a distance as possible.

The control information may also include information on inspection times. In particular, it can be determined at which times an inspection device inspects the wind turbine. The times can, for example, depend on a weather forecast and the forecast of an electricity price. This means that the control information can be used to plan the deployment so that the inspection is carried out at times when the electricity price falls below a lower threshold value. Since the inspection is preferably not carried out when the wind turbine is operating under full load, for example when the wind turbine is spinning, less revenue is generated at wind speeds above the switch-on wind speed because the available power is less than it could be. By coupling the inspection cycle to a development of an electricity price, a loss of revenue can be reduced.

As a rule, wind turbines have their own communication equipment, e.g. fibre-optic connections, WLAN, mobile radio and/or radio relay equipment. With these, bidirectional or unidirectional communication with the inspection device is possible. A hand-off between the different communication infrastructures can be realized for a flight route along different wind turbines. This makes it possible for the inspection device to communicate along a flight route via various communication devices of different wind turbines. The hand-off can be position-dependent and/or time-coordinated. In this way, range limitations of the communication devices arranged on one wind turbine can be overcome, since the communication can be taken over by another communication device of another wind turbine. In particular, the communication link also enables the exchange of control information, turbine parameters, operating parameters, sensor data and other information. This can also result in gaps in coverage between individual wind turbines (e.g. WLAN). These can be bridged by an autonomous flight until entry into the WLAN range zone of a next wind turbine. Redundant data transmission can also be achieved by using different communication devices/techniques.

According to an embodiment, it is proposed that the turbine interface is arranged to receive turbine parameters from the wind turbine. It is also proposed that the processor generates the control information depending on at least the turbine parameters.

It makes sense to be able to determine the lighting situation in advance during an inspection, e.g. a streak light situation or the like. This is particularly possible if the turbine parameters, in particular the azimuth angle, the pitch angle and/or the rotor angle, are known in advance or if the turbine parameters can be set accordingly. Knowledge of the geometry of the rotor blades, the nacelle or the entire wind turbine can also be useful. With the help of the information about a current alignment of the rotor blade surface at a point on the rotor blade, an appropriate positioning of the inspection device can be determined, for example, in interaction with a sun position or the relative position of the sun and its alignment and luminous intensity. Alignment and other recording parameters (e.g. focal length, exposure time, aperture, etc.) of a sensor, e.g. a camera, of the inspection device can also be carried out depending on the turbine parameters.

It is also possible for an artificial light source to be arranged on a system whose position, orientation and luminous intensity can be influenced. Such an artificial light source can also be controlled with the aid of turbine parameters. These turbine parameters can also be used to create the control information. With the help of the control information, the inspection device is positioned relative to the wind turbine in such a way that the best possible sensor-based inspection is possible. The light source can also be used from another platform (stationary, moving, flying or floating). In addition to the alignment of the light source, the turbine parameters can also be used to position or move the other platform. A coordinated movement/alignment of the light source and the inspection device as well as their sensors can also take place. If the artificial light source is aligned as required, suitable weather windows can also be used in darkness or twilight, which increases the selection of inspection times that limit the yield loss.

If the turbine parameters are known, the respective position of a rotor blade at a certain time can also be determined, for example. Knowing the rotor blade position at a certain time, it is also possible to assign recordings of sensors arranged on the inspection device to individual rotor blades. For example, individual mounts can be assigned to a particular rotor blade.

If the images of a sensor are provided with a time stamp, this time stamp can be compared with turbine parameters. Here, for example, the rotor blade position, which is also assigned to a time stamp, can be determined and thus an image can be assigned to a rotor blade. Thus an assignment of an individual mount to one rotor blade at a time can also be carried out afterwards.

Turbine parameters can differ, whether the turbine is in operation or not. In particular, the geometry of the rotor blades can be different in the loaded condition than in the unloaded condition. In addition to the knowledge of the geometry in the unloaded state as turbine parameters, the geometry in the loaded state can also be made available as turbine parameters. Blade preload and/or blade passage as a function of the rotor rotation angle and the pitch angle can be made available as turbine parameters both in the unloaded and in the (partially) loaded state. In particular, the deflection of a rotor blade from the hub to the tip of the rotor blade can be provided as a turbine parameter when the rotor is rotating.

In particular, this data can be used in real time for distance determination. In particular, turbine parameters can be determined from a CMS system of the wind turbine, in particular a CMS system for the rotor blade. Since a rotor blade deflects in the loaded condition, the distance of the inspection device to the rotor blade and/or the setting of the recording sensor must be adapted to the load situation if necessary. This is preferably done with the help of the turbine parameters from which the control information is created.

According to an embodiment, it is proposed that the device interface is arranged to receive operating parameters of the inspection device and that the processor generates the control information depending on at least the operating parameters. This makes it possible, for example, to adapt the control information depending on current operating parameters. Operating parameters can also be, for example, an energy storage state of the inspection device and, depending on this, an application planning for the inspection device can be carried out. The transmission of the operating parameters can, for example, be carried out from a control station or a wind farm monitoring system. A control room also makes it possible to transmit operating parameters to the inspection device and, if necessary, to receive operating parameters and/or sensor data.

Especially with changing environmental conditions, it may be necessary to adapt control information automatically. In particular, changes in environmental conditions can lead to unpredictable operating conditions of the inspection device. These operating states can be evaluated. If necessary, new control information must be transmitted to the inspection device.

According to an embodiment, it is proposed that the inspection device control device be arranged to receive environmental data and that the processor generate the control information depending on at least the environmental data.

Initially, resource planning can be weather-independent, for example. By evaluating environmental data, in particular weather data, it is possible to make the resource planning weather-dependent, in particular to define deployment times dependent on the weather.

In particular, environmental data may include sun position, sun elevation, radiation intensity, cloudiness information, wind direction, wind force, turbulence information, gust intensity, temperature, precipitation and/or visibility and the like. Environmental data can influence both flight scheduling and route planning. The environmental data can be used to calculate control information.

For example, it is possible to determine the control information using common weather variables such as wind force, wind direction, wind speed, gust intensity and/or cloud cover as well as information on the time of day from which a position of the sun can be calculated. In particular, resource planning and/or integration into the production and work planning of the wind turbine or the entire wind farm can take place. For example, resource planning can take place at times when a lull is predicted, in which case the wind turbines are not in operation anyway. On the other hand, an application planning can also be carried out in such a way that an inspection only takes place up to a wind speed below a limit value.

By the resource planning depending on the environmental data it is possible to inspect the wind turbines in particular the rotor blades in extended weather windows. In particular, the inspection time can be shortened, since the planning of the operation is also dependent on the lighting situation in particular and it can thus be ensured that the recording quality is sufficiently good. This leads to a minimization of the turbine standstill.

The environmental data can, for example, be made available manually or via a data interface, in particular from a SCADA system, in particular wired or wireless.

With the help of the environmental data, a wind direction in particular can be determined. This makes it possible to adjust the flight path planning in such a way that the inspection device is operated upwind of the running system. By operating upwind of the running turbine, turbulences at the inspection device can be avoided or reduced. The operation of the inspection device upwind of the running system can mean an operation on the pressure side.

By knowing the wind direction and thus the positioning of the inspection device relative to the rotor, it is also possible to set the viewing direction of a sensor. In particular, it is possible to drive the inspection device against the wind direction so that its position relative to the wind turbine is fixed. Then a sensor position, in particular a camera position, can be directed obliquely to the rear and or down or up. It is also possible to record with more than one sensor, for example two sensors, for example two cameras. The sensors can also be distributed over two inspection devices.

According to an embodiment, not only the control information, but also the turbine parameters are influenced depending on the environmental data. Thus, for example, it is possible to set the azimuth angle and/or the pitch angle of the wind turbine depending on the environmental data, in particular wind direction, wind force, turbulence intensity and/or position of the sun. This setting can preferably be made within a defined and/or permissible range.

By aligning the wind turbine in relation to the environmental data, a corresponding alignment to a source of light, such as the sun, can be achieved. Thus it is possible to set turbine parameters depending on the environmental data. Furthermore, the control information can be determined depending on the set turbine parameters and the environmental data. For example, a path of the inspection device can be set so that it is moved relative to the wind turbine in such a way that illumination of the rotor blade, in particular of a blade edge and/or blade surface, is optimized. In addition, the shutter time of a camera, for example, can be set with knowledge of the illumination intensity. Furthermore, a zoom, a camera angle or an autofocus can also be set in the control information, for example, in the knowledge of a distance to a wind turbine.

It is also proposed that environmental data be collected not only on a wind turbine but also, for example, on measuring equipment remote from the wind turbine, such as wind measuring masts, buoys or nacelle-based LIDAR near the wind turbine to be inspected. Such environmental data can, for example, be transmitted via WLAN, UHF, VHF, mobile radio, directional radio or the like. Data can also be relayed between different wind turbines in such a way that the weather data is transferred from wind turbine to wind turbine so that it can then be received at the target wind turbine and be evaluated there. Such information can also be transmitted via fiber optic cables between the wind turbines and a control room.

In particular, environmental data from windward wind turbines can be used for the wind turbine to be inspected. In particular, gust information can be used to vary current control information, for example to react to approaching gusts.

According to an embodiment, it is proposed that the processor is arranged to output turbine parameters for the wind turbine via the turbine interface. In particular, turbine parameters may depend on environmental data and/or operating parameters.

In particular, it makes sense to position the wind turbine, in particular the azimuth angle and/or the pitch angle, relative to a wind direction and a position of the sun. Based on the set turbine parameters, a flight path can be set so that it runs along the wind turbine with defined parameters to be set. For example, the sun can be located on the side facing away from the direction of the sensor. The light source can then be used to create an optimized lighting situation for the inspection within a hemisphere that curves behind the sensor plane. The positioning of the inspection device can also be controlled to prevent shadows from being cast on the wind turbine or rotor blades.

The viewing angle of the camera can be such that it points in a direction away from the position of the sun. By adjusting the azimuth angle of the wind turbine, it can be rotated to such a position that the inspection device is essentially located between the light source and at least one rotor blade. The inspection device is preferably located between the light source and the wind turbine. Strictly speaking, positioning exactly between the light source and the rotor blade is undesirable because of the shadow cast. Instead, the light source should be located within a hemisphere with an infinite diameter, the axis of symmetry of which is the direct connection between the recording sensor and the blade surface to be recorded. Thus, it is possible to first adjust the azimuth angle and, if necessary, also the pitch angle depending on environmental data, for example the position of the sun and/or the wind direction, so that the inspection device, if positioned as described above, is also on the windward side of the individual rotor blades. This leads to an optimal recording condition with less turbulence at the same time.

According to an example, the inspection device is a flying drone, in particular a mono- or multicopter. The inspection device can also be a vertical take-off and hovering VToL aircraft with wings to generate lift. Finally, it is possible that the inspection device is a tracker fixed to the wind turbine or mounted on a pivoting arm. For example, an arm can be provided on the nacelle or the tower which can be swivelled and at the end of which a gimbal tracker is arranged. A sensor, especially a camera, can be mounted on this gimbal. Due to its swivel capability around at least two axes, the Tracker is therefore well suited to take advantage of optimal lighting situations at the wind turbine at the time of their occurrence.

By evaluating the wind direction as well as the wind inflow velocities, it is possible to position the aircraft in the wind in such a way that a stationary hovering flight through the wind inflowing the wings is possible. This reduces the power consumption, as the buoyancy is at least partly made possible by the incoming wind.

It has also been recognized that a VToL aircraft may be differently equipped depending on wind speed or other weather conditions. It is therefore also proposed that, depending on the inspection task and the environmental conditions, wings with different dimensions and/or profiles can be used. It has also been recognised that the use of lift by the wind only makes sense at wind speeds above a lower limit speed. If the environmental data show that there is no sufficiently strong wind or that sufficiently long transit routes with a corresponding relative inflow of the wings are planned, the aircraft can also be used without wings. It is also possible to choose between a mono/multicopter and a VToL aircraft depending on the environmental conditions. The selection can be made automatically with the help of an algorithm.

The use of the wings can also be useful when relocating the aircraft from a first wind turbine to a second wind turbine. In particular, flight path planning may also be such that the wind flowing in between the wind turbines when they are installed supports the flight characteristics and, in particular, provides sufficient lift. This means that the drive energy accumulators and the rotors can be relieved. Longer flight times can also be made possible.

According to another example, it is proposed that the turbine parameters contain geoinformation of the wind turbine and/or that the operating parameters contain geoinformation of the inspection device and that the processor generates the control information depending on at least the geoinformation.

By using geoinformation from both the wind turbine and the inspection device, which can be made available to the processor as turbine parameters and/or operating parameters, the processor can adapt the control information to the current position of the inspection device. Unlike the use of distance sensors alone, there is no need for permanent detection and correction of the distance between the inspection device and the wind turbine. It should be mentioned that a combination of distance sensors and geoinformation can be useful. Knowing the geoinformation, it is possible, for example, to determine the position and orientation of individual areas of the rotor blade surface or each point of the rotor surface from the georeferencing of the turbine location and the geometry of the rotor blade, e.g. from 3D CAD data. If the azimuth angle, the pitch angle and/or the rotor angle are also known, a point on the rotor blade surface or its position in space can be determined with sufficiently high accuracy. If the position of the inspection device in the room is then known, a distance between a point/area to be measured on the rotor blade surface and the inspection device can be calculated. This distance information can be used for the calculation of the flight path as well as the alignment and recording parameters.

In addition to the use of geoinformation, it is of course also possible for distance sensors to be arranged alternatively or cumulatively on the inspection device. The distance sensors can be used to adjust the distance between the inspection device and the wind turbine or a rotor blade. A redundant collision avoidance is possible by a combination of distance sensors and geo information. In addition, a dynamic geofencing can be performed in which, for example, the distance between the inspection device and a rotor blade must not be less than one minium.

This dynamic geofencing can be particularly dependent on the equipment data, in particular on the azimuth angle and/or the pitch angle. If the turbine data is changed, it may be necessary to change the position of the aircraft relative to the wind turbine as well. Thus it is possible to use the system data, especially the pitch angle and the azimuth angle, to determine control information regarding the position of the inspection device and transmit it to the inspection device.

A GPS signal can be used to determine the position in space, or a differential GPS signal can be used for more precise determination, e.g. as part of an RTK measurement. In addition, Glonass, Beidou or Galileo signals can also be used to determine geoinformation.

By knowing the position of the inspection device and the position of a rotor blade, especially at any time, it is possible to synchronize a trigger time of a sensor with a passage of a rotor blade in the field of view of the sensor. If the rotational speed of the hub and/or the hub angle are known, the position of a rotor blade can be determined at any time. If, in addition, the position of the inspection device is known, as well as the orientation of the sensor, in particular its field of view, a recording window of the sensor can be determined. This recording window should contain the rotor blade to be inspected at the time of triggering. It can be calculated when this is the case so that the triggering can be synchronized with the passage of the rotor blade through the recording window.

In addition, the lighting situation in particular can be calculated using additional information, such as environmental data. From this the necessary distance of the inspection device to the inspecting rotor blade can be determined and included in the flight path planning. Predefined quality criteria, for example a pre-defined maximum resolution, can be determined. In order to achieve these quality criteria, a zoom factor and/or shutter time, for example, can be influenced/adjusted. The calculation of the position of the inspection device depending on these quality criteria can be carried out both in the inspection device control device and online within the inspection device itself.

It is also possible for an optical sensor in the inspection device to detect a reference on a rotor blade alternatively or cumulatively to the distance sensors and/or the geoinformation. In particular, a laser projection onto the rotor blade and a corresponding reflector can be used to determine a reference for the triggering time of the sensor, for example.

In addition to position determination using the methods mentioned above, it is also possible to determine a position on the basis of information about a wireless network, for example a WLAN or GSM network. Here, too, positioning information can be derived, even if it is less precise.

According to an embodiment, it is proposed that the processor is arranged to receive real-time data via the turbine interface and/or the device interface. This makes it possible to set control information, especially for the sensor, depending on current turbine data as well as operating data. For example, it is possible to synchronize the time of recording of the sensor with the blade passage of the rotor through the recording window of the sensor on the basis of system data transmitted to the inspection device in real time.

It is also possible to transmit operating information and sensor information in real time via wireless communication, such as WLAN, from the inspection device to a wind turbine. In particular, the data can be streamed in real time. With the help of the received data an evaluation can take place almost in real time. The data can also be forwarded to a central office. It is also possible to communicate wirelessly or wired, in particular using a fibre optic cable.

As already explained, it is possible to calculate both flight paths and flight times, which can also be understood as deployment planning, with the aid of the inspection device control direction in question. The calculation can be done automatically based on equipment data, operating data and/or environmental data.

By calculating flight paths it is also possible to set the turbine data in advance, in particular to set the azimuth angle, the rotor angle and/or the pitch angle of a wind turbine depending on the flight path and the flight time, for example. This setting is also dependent, for example, on environmental data, in particular the position of the sun, wind direction or wind force. By calculating the flight route in advance, taking into account current and/or future environmental data, turbine data and/or operating data, it is possible to reduce the flight route and/or keep the flight time per equipment as short as possible.

The lighting situation can be taken into account during the planning of the flight path. Here it is possible to calculate an angle of incidence of light from the light source, for example sunlight, onto the rotor blade surface in advance. Depending on this, a flight period (e.g. the time of day) as well as the azimuth and/or pitch angle can be set. In addition, the flight path is adjustable, so that the inspection device in particular is positioned with respect to the light source and the wind turbine during an image acquisition in such a way that an optimum lighting situation is created. In particular with flat angles of incidence of the light from behind or from the side, especially with oblique light, it is possible to detect even small surface inhomogeneities, such as microcracks, photographically and possibly also photometrically.

The orientation of the inspection device or the viewing direction of a sensor in the direction of a rotor blade can also be determined in advance. Thus, an image acquisition angle relative to the longitudinal axis of the blade or to the chord of the blade profile can be included in the flight path planning so that a defined range of the image acquisition angle is maintained. In addition, a turbine alignment can also be determined on the basis of the turbine parameters and output as equipment data.

When planning the flight path, it is possible to automatically determine in which spatial area relative to a rotor blade the inspection device can be positioned. In particular, the height of the inspection device, the position of the inspection device and/or the horizontal distance parallel and/or perpendicular to the rotor axis can be determined to optimally accommodate individual areas of a rotor blade.

It is also possible to calculate a positioning on the leeward side of the rotor blade, where the flight stability or image quality is not impaired inadmissibly. This is possible, for example, by calculating turbulence, which can be particularly dependent on the wind direction relative to the azimuth angle of the wind turbine. Shadowing by the tower or the foundation can be particularly relevant here. By adjusting the pitch angle of the rotor blades it is also possible to take a picture from the leeward side of the individual rotor blades, depending on the wind speed, gust and turbulence intensity. In particular, the rotor rotational speed and/or the pitch angle can be adjusted in such a way that turbulence is kept to a minimum, thus maximizing the inspection window in which the inspection device can be used.

During flight route planning it is also possible to consider environmental information, in particular turbulence from wind turbines remote from the wind turbine currently being inspected. In order to reduce turbulence, it is possible that individual wind turbines are operated with reduced power in the windward direction, starting from the location of the inspection device. As a result, lower turbulence is to be expected on the lee side of these power-reduced wind turbines. This control of the power reduction can be automated on the basis of modelled or measured empirical values. For example, it is possible to change the settings of windward wind turbines on the basis of real-time data from the inspection device, such as large vibrations or changes in position due to turbulence, or on the basis of measurements taken with turbulence measuring devices, lidar, etc. The settings can be changed by means of a wind turbine with a windward wind turbine.

Also a network coverage by a radio network can be considered with the flight route planning. Spatial and/or temporal coverage of wireless signal transmission links, be it WLAN, mobile radio, UHF, VHF or similar in the area of a wind turbine can be taken into account for flight route planning. Coverage and shadowing effects by way of fixed and mobile structures can be taken into account.

A future status of a wind turbine due to weather, maintenance or operating restrictions can also be taken into account for flight scheduling. In particular, an inspection can be carried out particularly easily in the case of maintenance already carried out, which can be relevant for the calculation of the flight schedule.

A further aspect is an inspection device. This inspection device is automatically supplied with control information by the inspection device control device, which can include flight times and flight route plans in particular.

According to an embodiment, at least one sensor, preferably an imaging sensor, can be provided on the inspection device. The alignment of the sensor can take place depending on the control information, so that the sensor can be aligned in particular in the direction of the wind turbine.

A sensor may in particular be a photo sensor, but it is also possible to use other sensors such as infrared sensors, laser sensors, lidar or radar sensors, terahertz sensors, X-ray sensors, ultrasonic sensors (where contact between sensor and rotor blade may be necessary) and other passive and/or active sensors for non-contact inspection, in particular for non-contact detection of reflected radiation (e.g. also for shearography).

The sensor data can be processed and coded in the inspection device virtually in real time.

It is also possible that the data collected by the sensors can be evaluated photographically, photometrically or photogrammetrically. By using scale information or reference points or reflectors on the rotor blade, a photogrammetric evaluation of the blade geometry can be carried out.

The use of artificial light sources is possible, especially in darkness or low sunlight. The alignment of the light source in combination with the pitch angle and the respective hub angle at the time of recording can be calculated so that optimum lighting conditions are achieved. It is also possible that an additional lighting source can emit radiation with wavelengths outside the visible light. The additional light source can be ground based or also flying. It is also possible that the additional light source is located on the inspection device itself, or can be used as an independent platform, in particular as a flying drone. It is also possible that the flight path and/or flight time between the additional lighting device and the inspection device is synchronised.

As already explained, the control information can also contain control information for the sensor. In particular, a trigger time, a shutter time, an aperture, a sensor orientation, a focal length of an imaging sensor can be dependent on the control information.

The positioning of the inspection device relative to the wind turbine is also done by the control information. In addition, the inspection device can be independently positioned using optical markings on the wind turbine itself. A combination of these two positioning methods is also possible.

In particular, the distance of the inspection device or its sensor to a rotor blade to be inspected may be relevant for the adjustment of the sensor. Distance information can be particularly relevant for the focus adjustment of a sensor. With the help of the information about a relative distance between the inspection device and the wind turbine, it is possible, for example, to support an autofocus of a camera. Here it is possible to limit the search range of an autofocus of a camera as narrow as possible by communicating the distance information to the autofocus in advance, so that it only has to focus in a very narrow search field.

Another aspect is a procedure for operating an inspection device.

During flight route planning it is possible to inspect several wind turbines one after the other. By optimizing the flight path, especially depending on the environmental data, it is possible to move the inspection device from a first inspected system to a second inspected system. Flight path planning is preferably carried out in such a way that the height change of the inspection device is reduced as far as possible, as this leads to lower power consumption and thus to longer flight duration.

It is also possible to equip the inspection device with floating bodies. In particular, any cavities within the aircraft may be watertight so that they form floating bodies. In the event of an accident, the floating bodies prevent the inspection device from sinking during the inspection of offshore installations. Floating bodies may in particular also be wings of the aircraft, if any. Other structures can also be designed as watertight chambers so that they serve as floating bodies.

An inspection device has means for wireless communication. In particular for receiving control information and for transmitting operating data and sensor data. Operating data can contain sensor data. It is also possible that one inspection device serves as a carrier and/or relay station for the data transmission of another inspection device. The data can also be transferred directly between the inspection device and a fixed or mobile communication structure. A mobile communication structure can be, for example, a vehicle, a ship or a manned or unmanned aircraft.

Flight route planning can take into account which relay stations and wireless communication links are available, so that a flight path is planned as close as possible to flight corridors that allow a communication link.

In order to keep downtime to a minimum, it is proposed that the inspection devices can be loaded at as many fixed structures as possible. When planning the flight route, it is possible to take into account the positioning of charging stations and thus park the inspection device at charging stations during an inspection cycle. Such charging stations can be installed on land as well as offshore on fixed or mobile structures.

By considering current and/or predicted environmental data in real time, it is possible to adapt control information to changing environmental data. It may be necessary to land the inspection device, especially in rapidly changing weather conditions. To this end, it is proposed that landing structures be made available on-shore or off-shore. Flight route planning can also be such that a distance to a landing structure does not exceed a maximum value.

Also, ranges for focal length, exposure time, etc. can be set depending on environmental conditions (especially illuminance and "wobble" of the inspection device, i.e. differential changes of position and orientation in all three spatial directions/around all axes).

Based on defined parameter ranges, a plausibility or quality check can be carried out immediately after the recording based on the actual recording data; in unacceptable conditions (e.g. accelerations too high for the set shutter time), a recording can be discarded.

For setting the shutter time, the maximum expected speed and/or angular speed of a point to be recorded relative to the center of the recording sensor can be used, for example. This can result, for example, from the rotational speed of a rotor blade and the superimposed mean or maximum obtained accelerations of the inspection device due to turbulence.

The inspection device may be equipped with one or more sensors. The sensors can also be exchanged so that an inspection is first carried out with a first sensor and then with a second sensor.

BRIEF DESCRIPTION OF THE DRAWING

These and other aspects are explained in more detail below using a drawing showing embodiment. In the drawing.

DETAILED DESCRIPTION

Figure 1:
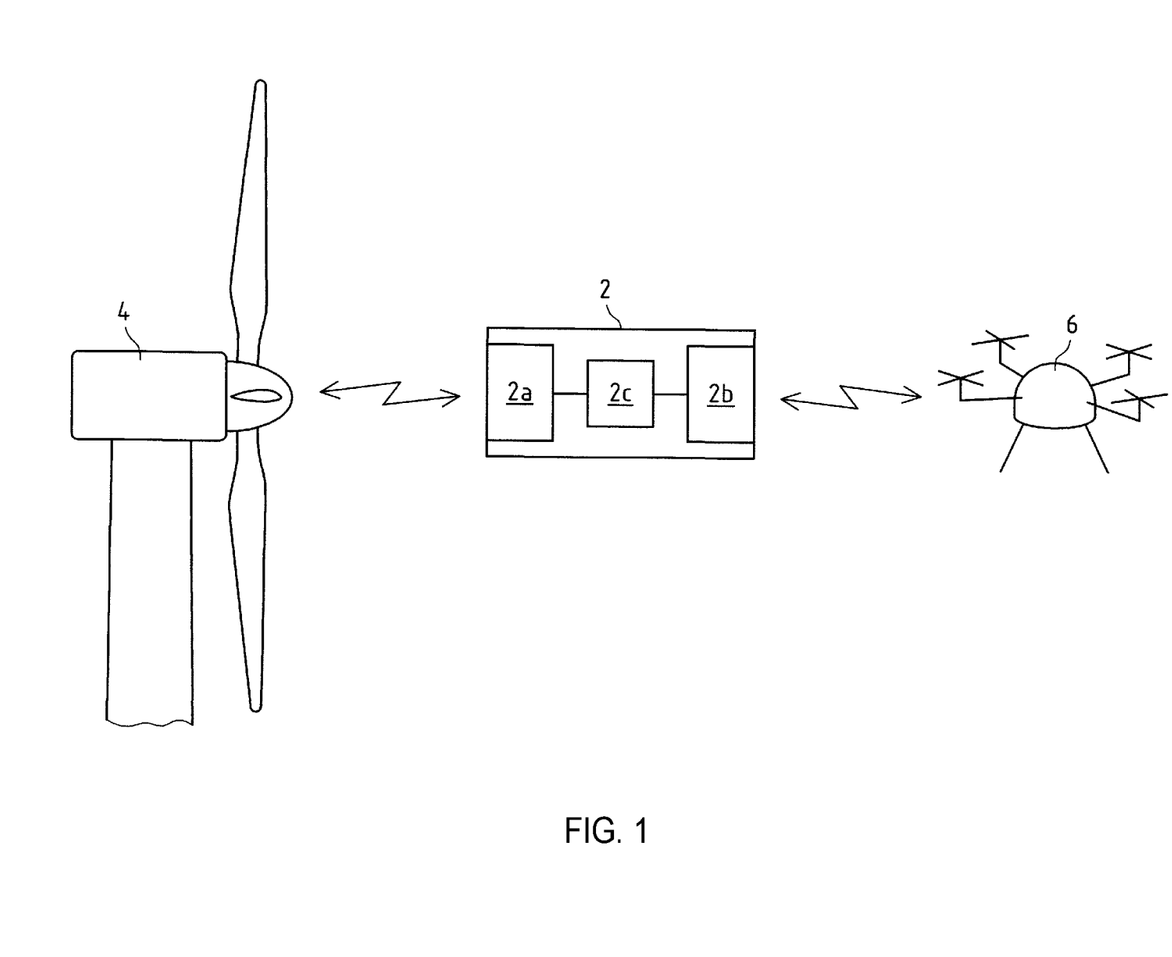
FIG. 1 schematically depicts a system with an inspection device control device and an inspection device.

FIG. 1 shows an inspection device control device 2 with a turbine interface 2a as well as a device interface 2b and a processor 2c. It is understood that the representation in FIG. 1 is greatly simplified and the inspection device control device may include other elements such as a memory and other components necessary for the calculation of flight routes and times. The inspection device control device 2 can be operated with the aid of a software product which at least partially executes the procedures according to the subject matter. The inspection device control device can also be fully or partially implemented on board of the inspection device.

FIG. 1 also shows a wind turbine 4 and an inspection device 6.

Instead of the wind turbine 4, a SCADA system of a wind turbine 4 or a wind farm can also be used.

The inspection device 6 can be designed in particular as a flying drone, for example as a multicopter or as a VToL vertical take-off aircraft with fixed or movable wings.

FIG. 1 shows that the turbine interface 2a is set up for wireless communication with the wind turbine 4. Of course, it is also possible that the communication is wired or can be a combination of a wireless communication and a wired communication.

Furthermore FIG. 1 shows that the device interface 2b establishes a wireless communication with the inspection device 6. This communication can also be at least partially wired. Communication between the device interface 2b and the inspection device 6 can also take place via relay stations.

In particular, turbine data is exchanged bidirectionally between the inspection device control device 2 and the wind turbine 4 via the turbine interface 2a. Thus it is possible to transmit real-time data as well as forecast data for the wind turbine 4 to the inspection device control device 2. It is also possible to transmit turbine parameters from the inspection device control device 2 to the wind turbine 4 via the turbine interface 2a to influence the operation of the wind turbine 4. This makes it possible to influence the operation of the wind turbine, in particular turbine parameters such as pitch angle, azimuth angle and/or the like.

Via the device interface 2b, the inspection device control unit transmits 2 control information to the inspection device 6. In particular, control information can be flight routes, flight times, sensor control information, distance information, geoinformation (e.g. also position information of other fixed or mobile structures which may require minimum distances or serve as landing points) or the like. Operating data can be fed from the inspection device 6 into the inspection device control device 2 via the device interfaces 2b. These operating data are in particular real-time data, i.e. operating parameters of the inspection device 6 can be transmitted to the inspection device control device 2 in real time.

With the help of processor 2c, the data is processed and corresponding turbine parameters and/or control information are created, which are transmitted to the wind turbine 4 or the inspection device 6.

In addition to the turbine parameters, control information and operating parameters, environmental data can also be fed into the inspection device control unit 2 via an interface that is not shown.

The inspection device control device 2 thus forms a real-time interface between the wind turbine 4 and the inspection device 6, making it possible both to plan the use of the inspection device 6 depending on forecasts, in particular on weather data, and to control both the wind turbine 4 and the inspection device 6 in real time depending on each other and/or also depending on environmental data, maintenance and resource planning information for individual wind turbine sites of the wind farm, electricity market data or the like.

First a flight route of the inspection device 6 is planned with the help of the processor 2c. The position of the sun as well as the direction of the wind are preferably taken into account. By suitable adjustment of the azimuth angle it is possible to position the inspection device 6 between the sun and the wind turbine on the windward side of the wind turbine 4. The respective position of a rotor blade can be transmitted to the inspection device 6 in real time so that the inspection device can be guided on a suitable flight path, or a camera or other sensor can be triggered on the inspection device 6 at an exact time when the rotor blade is moving through the field of view of the sensor while the rotor is rotating.

Figure 2:
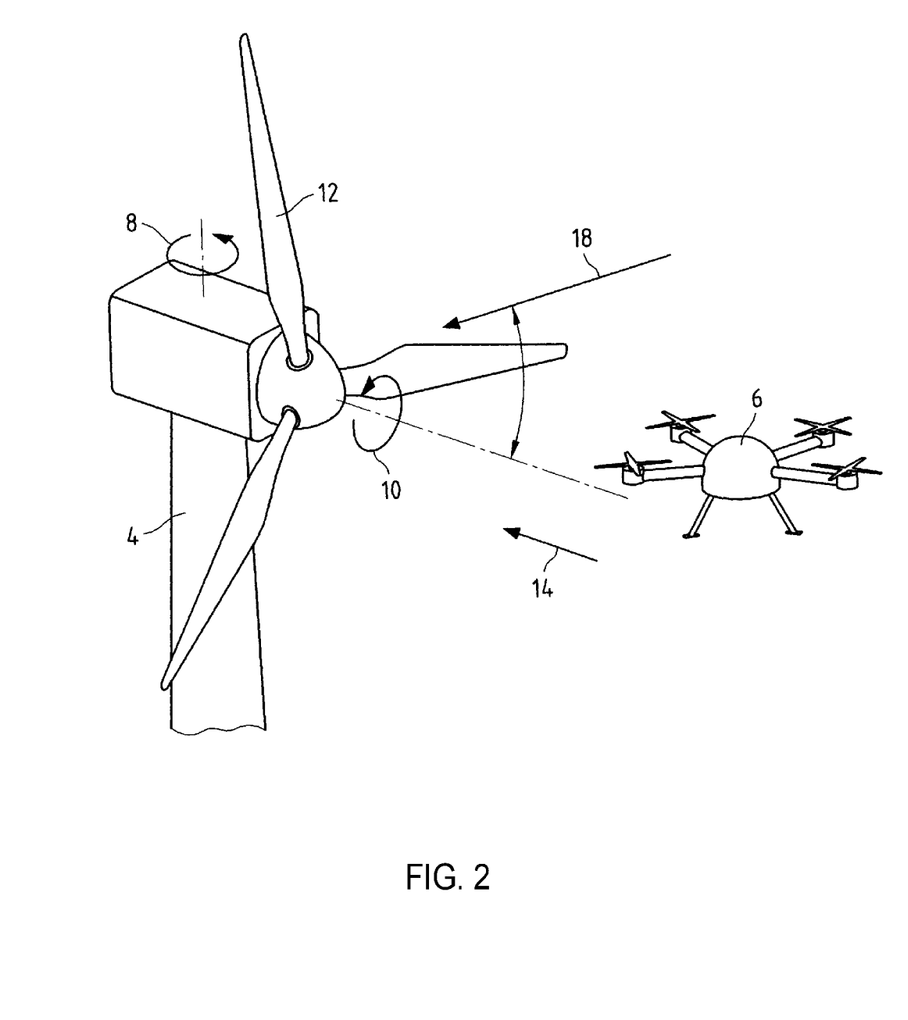
FIG. 2 is a schematic view of a wind turbine with an inspection device.

A possible positioning of the inspection device 2 relative to the wind turbine 4 is shown in FIG. 2. FIG. 2 shows the wind turbine 4, its azimuth angle 8 as well as its pitch angle 10 of the rotor blades 12, which result from the current operating condition or which can be actively influenced for the best possible recording quality.

The inspection device control device 2 receives environmental data, such as information on a wind direction 14 and an angle of incidence 18 of the sun. Depending on the wind direction 14 and the angle of incidence 18, the azimuth angle 8 is set. The inspection device 6 is then positioned on the windward side of the rotor blades 12.

The pitch angle 10 of the rotor blades 12 can, for example, go into flag position so that the wind turbine tumbles. This results in as little turbulence as possible in the area of the rotor blades 2. With the aid of the inspection device 6, one rotor blade 12 can now be inspected at a time.

Figure 3:
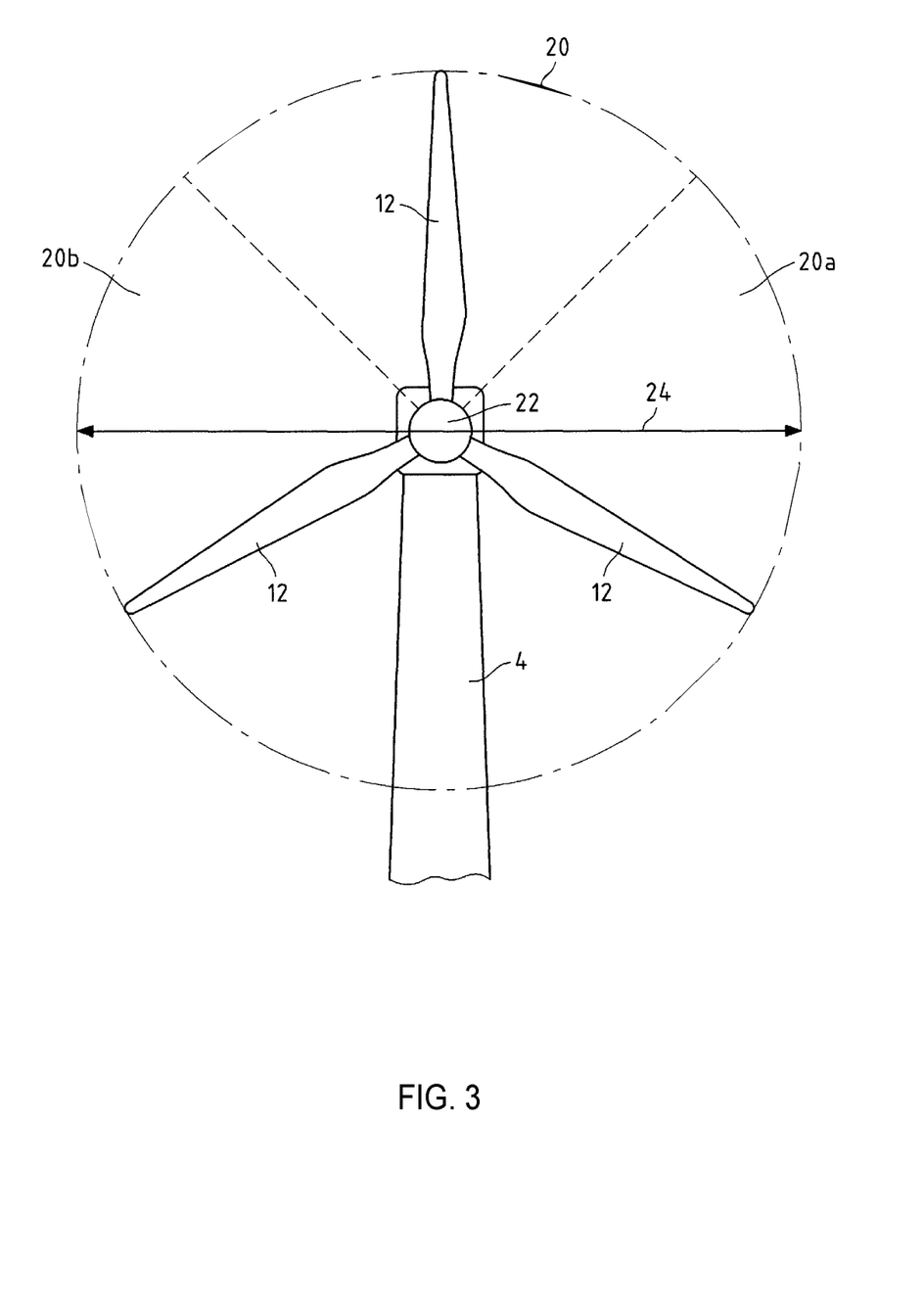
FIG. 3 is a schematic view of a flight route of an inspection device along a wind turbine.

FIG. 3 shows an exemplary flight route along a wind turbine 4. Here the rotor blade circumference 20 can be divided into two circular segments 20a, b. The rotor blades 12 rotate around the hub 22 and pass through the two circular segments 20a, b. The azimuth angle 8 is set so that the wind is preferably directed into the drawing plane. With a flight path of 24, it is possible to inspect all rotor blades 12 with as little movement of the inspection device 6 as possible, as well as to inspect the blade leading edge and the blade trailing edge of the respective rotor blades on the pressure and/or suction side.

By the suitable adjustment of the pitch angle 10 as well as by the suitable alignment of the sensor unit it is possible that in the circle segment 20a for example a blade suction side can be inspected and in the circle segment 20b then the blade pressure side.

First, the inspection device 6 is moved into the circle segment 20a on the flight route 24. The rotor blades rotate and all pass through the circle segment 20a. By means of a suitable control with knowledge of the rotational speed of the wind turbine or the hub 22 and thus of the respective position of a rotor blade 12, the inspection device 6 can carry out a recording or other sensor inspection of one of the rotor blades 12, in particular of a blade pressure side, at specific times. By knowing the rotor blade positions as well as the position and orientation of the inspection device or sensor unit, it is possible to assign the respective recorded values to a rotor blade and a position on its longitudinal axis. After all three rotor blades 12 in the circle segment 20a have been inspected, the inspection device 6 is moved along the flight path 24 into the circle segment 20b. In this case, no change in altitude is preferred, which contributes to the extension of the flight time.

Then, as in the 20a circle segment in the 20b circle segment, each individual rotor blade 12 is inspected, whereby a pitch angle of 10 can be set to inspect a blade pressure side, for example.

With suitable geoinformation as well as geometry data of the rotor blades 12 it is possible to consider a distance 26 between an inspection device 6 and a rotor blade 12 in the flight route planning.

Figure 4:
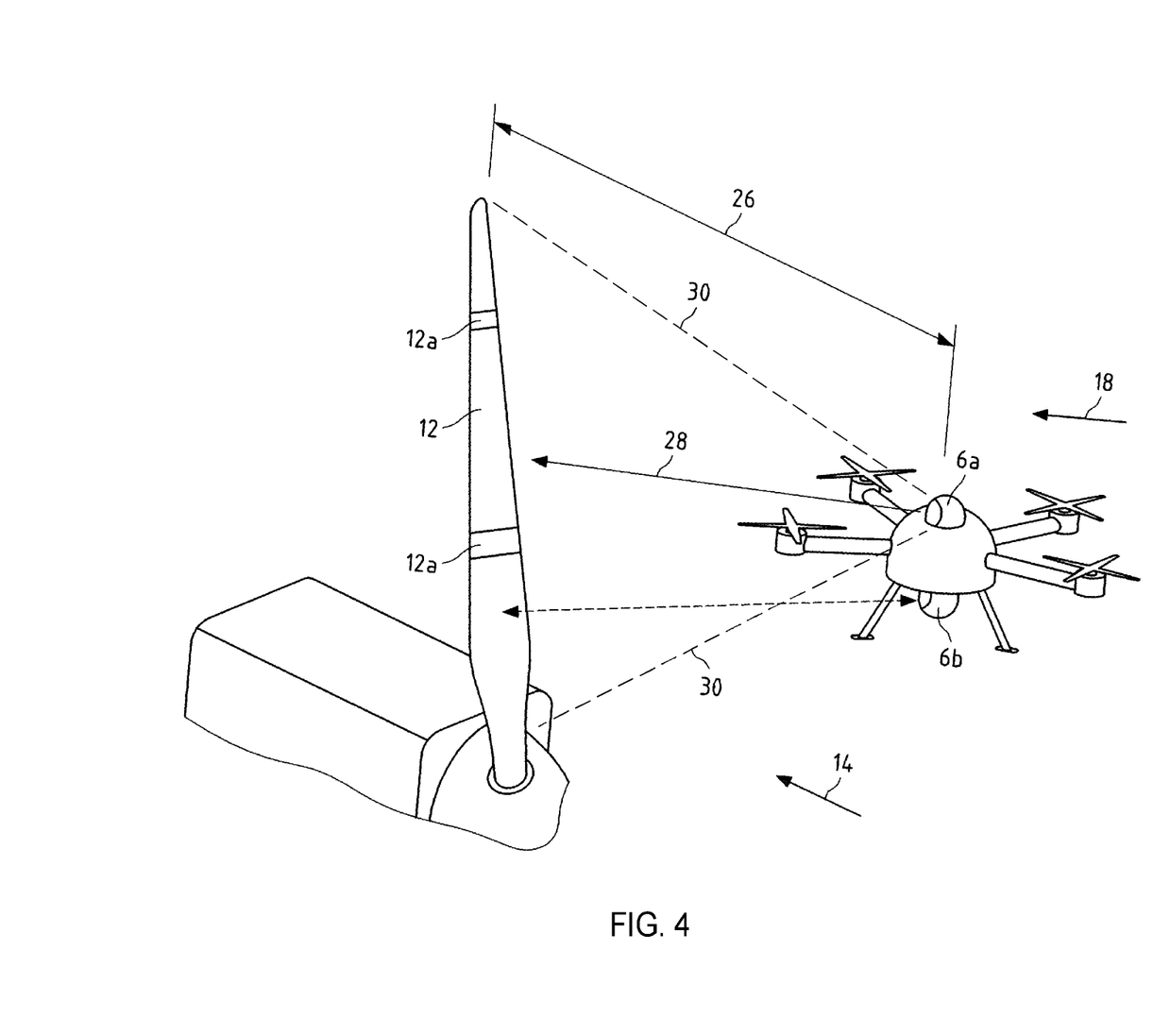
FIG. 4 is a schematic view of the positioning of an inspection device on a rotor blade.

FIG. 4 shows that the inspection device 6 has a distance 26 from the rotor blade 12. This distance 26 is preferably precalculated. The geodata of the inspection device 6 are known during operation. If, in addition, the geodata of the wind turbine 4 and thus of the rotor blade 12 are known, a relative distance 26 between the inspection device and 6 and the rotor blade 12 can be determined. The flight route 24 is then set so that this distance 26 is maintained.

A sensor 6a, for example a camera and a distance sensor 6b, can be arranged on the inspection device 6.

It is possible that markings 12a, e.g. reflectors, are arranged on the rotor blade 12. With the help of the distance sensor 6b, these markings 12a can be read out and thus alternatively or cumulatively the distance 26 of the inspection device 6 to the rotor blade 12 can be determined.

It can also be seen that the sensor 6a, for example a camera, has a viewing direction 28 and a viewing angle 30. Both can be set independently of the orientation of the inspection device and can be continuously changed along the flight path if necessary. This enables an ideal alignment of the sensor with regard to an energy-minimized flight path under given boundary conditions for the quality of the images.

The flight route 24 is planned such that both the wind direction 14 and the angle of incidence 18 are such that the inspection device 6 is on the windward side of the rotor blade 12 and the light source is on the side opposite to the plane of the recording lens of the recording sensor.

Figure 5:
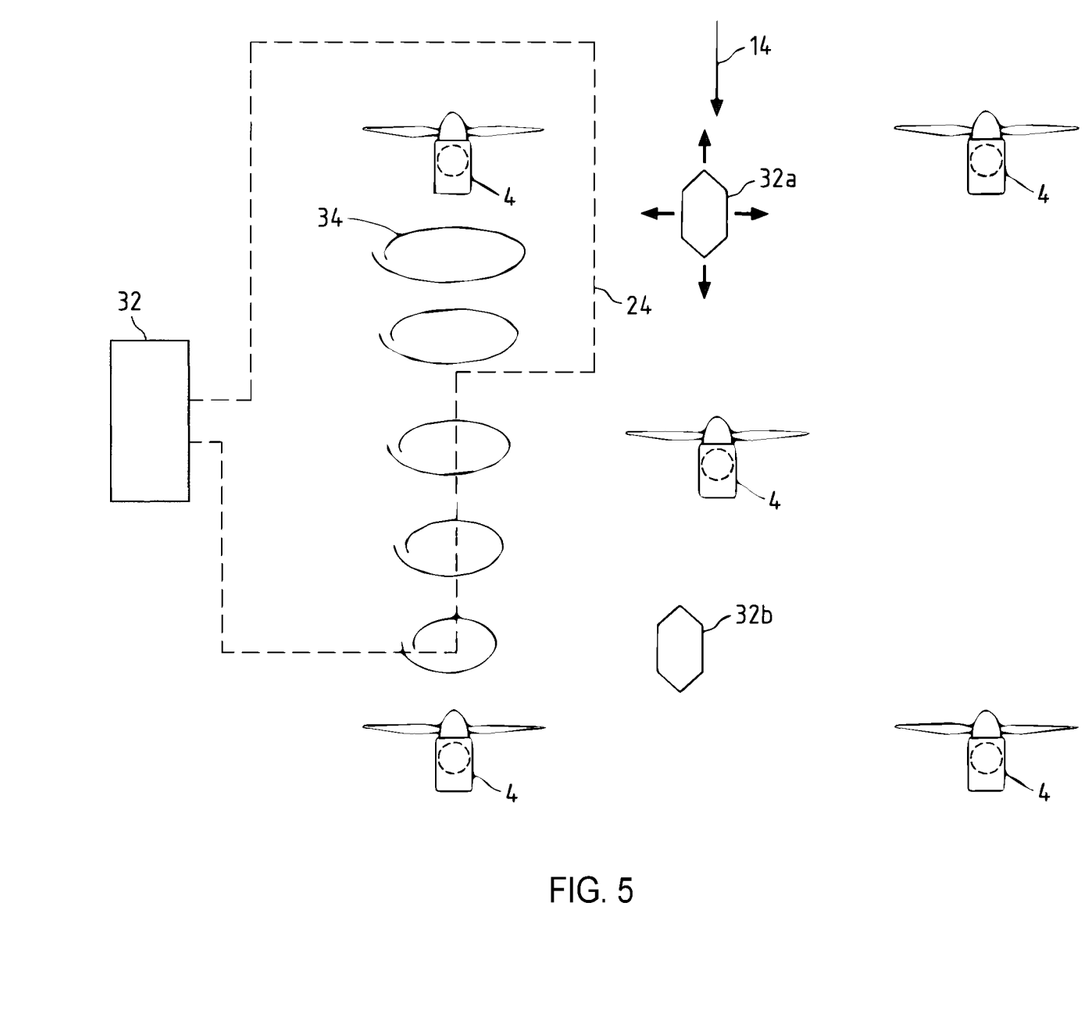
FIG. 5 is a schematic view of a flight route planning in a wind farm.

FIG. 5 shows a possible flight route planning with a flight route 24 along a plurality of wind turbines 4 in a wind farm.

Depending on wind direction 14, the inspection device 6 is started from a start ramp 32 (e.g. located on the substation of the wind farm) and flies first in the direction of a specific wind turbine 4. The inspection device 6 is positioned in front of the wind turbine 4 in such a way that a lighting situation is optimized as described above. Then, taking wind direction 14 into account, the flight route 24 is planned so that the next wind turbine 4 can be approached with the minimum possible use of energy.

FIG. 5 shows that this is the wind turbine 4 at the bottom left. The wind turbine 4 in the upper left corner generates vortices or turbulences 34, which can influence the inspection of the second wind turbine 4 by the inspection device 6. Through online evaluation of operating data, control information, environmental data and equipment data, it is possible to influence turbine data in such a way that turbulence is minimised.

Also shown in FIG. 5 are mobile and stationary alternative landing sites 32a, 32b. These can be taken into account in flight route planning and can be used in the event of errors or for intermediate refuelling (recharging).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An inspection control device for an inspection device of a wind turbine, comprising:
   a turbine interface arranged for communication with a wind turbine control system of the wind turbine; and
   a device interface arranged for communication with the inspection device;
   wherein a processor generates control information for the inspection device and outputs the control information via the device interface in dependence on turbine parameters of the wind turbine received via the turbine interface; and
   wherein the processor outputs further control information for a flying platform with a lighting source depending on the turbine parameters received via the turbine interface; and
   wherein the control information enables the inspection device to perform an inspection of the wind turbine while a rotor of the wind turbine is rotating.

2. The inspection device control device according to claim 1, wherein the turbine interface is arranged to receive turbine parameters from the wind turbine or a wind farm and the processor generates the control information depending on at least the turbine parameters.

3. The inspection device control device according to claim 1, wherein the device interface is arranged to receive operating parameters of the inspection device, and the processor generates the control information depending on at least the operating parameters.

4. The inspection device control device according to claim 1, wherein the inspection device control device is arranged to receive environmental data, and the processor generates the control information depending on at least the environmental data.

5. The inspection device control device according to claim 4, wherein the device interface is arranged to receive operating parameters of the inspection device, and the processor generates the control information depending on at least the operating parameters.

6. The inspection device control device according to claim 5, wherein the processor is arranged to output turbine parameters for the wind turbine via the turbine interface, the turbine parameters being dependent in particular on the environmental data and/or the operating parameters.

7. The inspection device control device according to claim 1, wherein the inspection device is a flying drone, in particular a multicopter or a vertical take-off and landing aircraft with wings, or a tracker fixed or pivotably attached to the wind turbine.

8. The inspection device control device according to claim 1, wherein the turbine parameters contain geoinformation of the wind turbine and/or wherein the operating parameters contain geoinformation of the inspection device, and wherein the processor generates the control information as a function of at least the geoinformation of the wind turbine and/or of the inspection device.

9. The inspection device control device according to claim 1, wherein the processor is arranged to receive real-time data via the turbine interface and/or the device interface.

10. The inspection device control device according to claim 1, wherein the control information contain in particular flight routes and/or flight times.

11. The inspection device control device according to claim 1, wherein the control information enables the flying platform to provide illumination of the wind turbine from the lighting source during the inspection by the inspection device while the rotor of the wind turbine is rotating.

12. A method of operating an inspection apparatus control device for a wind turbine inspection apparatus, comprising:

exchanging wind turbine parameters with a wind turbine control system, and exchanging first control information with the inspection device, wherein the first control information for the inspection device is generated and output, depending on the turbine parameters and/or environmental parameters, to enable the inspection device to perform an inspection of the wind turbine while a rotor of the wind turbine is rotating and/or wherein second control information for the wind turbine is generated and output depending on the inspection device parameters and/or environmental parameters, to enable the inspection device to perform an inspection of the wind turbine while the rotor of the wind turbine is rotating and wherein third control information for a flying platform with a lighting source depending on the turbine parameters is output to provide illumination of the wind turbine to enable the inspection device to perform an inspection of the wind turbine while the rotor of the wind turbine is rotating.

\* \* \* \* \*